US009008703B1

(12) United States Patent
Major et al.

(10) Patent No.: US 9,008,703 B1
(45) Date of Patent: Apr. 14, 2015

(54) UBIQUITOUS VOICE MESSAGING

(75) Inventors: John Major, Rancho Santa Fe, CA (US); Peter Lasensky, San Diego, CA (US)

(73) Assignee: NoteVault, Inc., San Diego, CA (US)

( * ) Notice: Subject to any disclaimer, the term of this patent is extended or adjusted under 35 U.S.C. 154(b) by 134 days.

(21) Appl. No.: 13/247,947

(22) Filed: Sep. 28, 2011

Related U.S. Application Data

(62) Division of application No. 12/358,130, filed on Jan. 22, 2009, now Pat. No. 8,126,437.

(60) Provisional application No. 61/023,293, filed on Jan. 24, 2008.

(51) Int. Cl.
*H04W 4/00* (2009.01)
*H04W 80/06* (2009.01)

(52) U.S. Cl.
CPC .................................. *H04W 80/06* (2013.01)

(58) Field of Classification Search
CPC ........... H04W 4/12; H04W 4/14; H04W 4/16; H04W 4/18; H04W 88/184; H04W 4/06; H04W 24/00; H04W 36/14; H04W 48/02; H04W 4/001; H04L 51/14; H04L 12/585; H04L 51/04; H04L 12/581
USPC ............ 455/415, 412.1–414.2, 466; 709/203, 709/204, 205; 370/1.03, 93.01
See application file for complete search history.

(56) References Cited

U.S. PATENT DOCUMENTS

| | | | |
|---|---|---|---|
| 7,054,863 B2 | 5/2006 | Lasensky et al. | |
| 7,522,913 B2 | 4/2009 | Kraft | |
| 7,653,691 B2 | 1/2010 | Lasensky et al. | |
| 8,014,757 B1 | 9/2011 | Lim | |
| 8,116,743 B2 * | 2/2012 | Helferich | 455/413 |
| 2002/0161775 A1 | 10/2002 | Lasensky et al. | |
| 2003/0158859 A1 | 8/2003 | Lasensky et al. | |
| 2005/0058260 A1 * | 3/2005 | Lasensky et al. | 379/1.03 |
| 2006/0112118 A1 | 5/2006 | Lasensky et al. | |
| 2007/0060096 A1 | 3/2007 | Hayakawa | |
| 2008/0228882 A1 | 9/2008 | Lasensky et al. | |
| 2009/0280754 A1 | 11/2009 | Lasensky et al. | |

FOREIGN PATENT DOCUMENTS

| | | |
|---|---|---|
| AU | 2004303399 A1 | 3/2005 |
| AU | 2005269716 A1 | 4/2006 |
| CA | 2536950 A1 | 3/2005 |

(Continued)

*Primary Examiner* — Quan M Hua
(74) *Attorney, Agent, or Firm* — Pillsbury Winthrop Shaw Pittman LLP

(57) ABSTRACT

Methods and apparatus for providing ubiquitous and configurable communications between users is provided. Ubiquity and other features are provided using a common identifier linking two or more users. In one embodiment, a common identifier is automatically provided when call forwarding is directed to a designated phone number. In another embodiment, a user can cause a common identifier to be created linking the user with a user of their choice by sending an SMS text message to a designated address. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

16 Claims, 4 Drawing Sheets

(56) References Cited

FOREIGN PATENT DOCUMENTS

| CA | 2578522 | A1 | 4/2006 |
| EP | 1665066 | A2 | 6/2005 |
| EP | 1810192 | A1 | 7/2007 |
| WO | WO-02/41222 | A1 | 5/2002 |
| WO | WO-2005/027472 | A2 | 3/2005 |
| WO | WO-2006/036776 | A1 | 4/2006 |

* cited by examiner

UBIQUITOUS VOICE MESSAGING

CROSS-REFERENCE TO RELATED PATENT APPLICATIONS

This application is a divisional of U.S. application Ser. No. 12/358,130, filed Jan. 22, 2009, which claims priority from Provisional Application U.S. Application 61/023,293, filed Jan. 24, 2008. All of the above-referenced application are incorporated herein by reference in their entirety.

FIELD OF THE INVENTION

The present invention relates generally to the field of communications, and more specifically, to providing more ubiquitous and flexible multi-mode communications between mobile communications devices.

BACKGROUND OF THE INVENTION

Contemporary mobile communications devices typically incorporate multiple communications modalities into a single device. In addition to traditional voice communications service, current mobile phones typically also provide voicemail, Short Message Service (SMS or "texting"), Email, call forwarding, and Internet connectivity. Of these, SMS has, because of its unobtrusive and flexible nature, become the fastest growing and most ubiquitous mode of communication. For many users, texting via the SMS protocol is preferred over traditional voice communication. One of the advantages of SMS texting, in addition to being less obtrusive, is that a text message is much more robust against the various factors that can disrupt live voice communications. For this reason, a text message is often used as an invitation to participate in a live voice call at some later, more convenient time and location. Newer devices such as the Apple iPhone™ have tended to blur the distinction between text and voicemail with features such as "visual voicemail." However, many mobile phone users have been slow to adopt texting, referring instead to attempt a voice call as the default communication method. When, for various reasons, a voice call cannot be completed, the caller typically either hangs up or leaves a voicemail that may not become available to the recipient until much later. Another limitation of currently implemented voicemail occurs when a caller would like to be able to deliver a single voicemail to multiple recipients quickly and reliably.

For these and other reasons, there still remains a need to further integrate, automate, and simplify the various communications modes. In particular, there is a need to leverage the ubiquity of text messaging to enhance the effectiveness of live voice and voicemail modes of communications.

SUMMARY OF THE INVENTION

Exemplary embodiments include providing an enhanced phone service that facilitates alternative communication modes in the event of an unanswered phone call. These enhanced phone services include establishing a common number linking the caller and recipient that can be used by both parties to avail themselves of other enhanced features provided by the system. In some embodiments, the invention includes receiving calls that are automatically forwarded to a system-linked phone number when a service subscriber recipient does not answer. Call forwarding and caller ID are services provided by virtually all phone service providers, so this exemplary embodiment is available to virtually all phone users. In order to carry out this particular embodiment, a subscriber programs their phone to redirect incoming phone calls to a phone number provided by the service of the exemplary embodiment. When a redirected call is received, the service links the subscriber and caller's phone numbers with a common identifier phone number, which provides additional utility for both caller and subscriber/recipient as will be elaborated upon below. The service then may send text messages to the caller and subscriber recipient informing them of the missed call and the common identifier number, thereby allowing the parties various options and opportunities to communicate using voicemail, text messages, or by connecting them directly by real time voice communication.

To better understand the functioning of this and other embodiments, some explanation of the way the common identifiers are utilized will be described. In some embodiments, features provided by the invention are accessed using phone numbers assigned by the service in lieu of dialing a recipient's phone directly. The system creates an association between a particular common identifier and a subscriber phone number. The system further creates an association between the common identifier and another user's (or users') phone number(s). These associations are stored in a database maintained by the system. Each subscriber phone number and common identifier combination is unique. The common identifier will typically be a ten-digit phone number, although other types of common identifiers such as Email addresses or URL's are contemplated. Taking the example of a common identifier as a phone number, when a common phone number provided by the service is called, the call is routed through the service, which can then provide a variety of responses associated with that particular user/common identifier phone number combination. Thus, the service can allow the subscriber to determine certain aspects of how a call to that particular common number is carried out. In addition to simply connecting the subscriber directly with the other user or users associated with that particular common number, other options may also be offered such as leaving a voice message or sending a text message to the recipient advising them they have voicemail. Common numbers may also be selected to provide local access, thereby avoiding toll charges that might accrue when calling the recipient directly. It may be advantageous to assign different common identifiers linking two or more users to each user. This may ease the problem of assigning unique common identifiers to each user. This could become problematic, for example, where the number of common identifiers already assigned to two users is large compared to the number of available common identifiers, in which case there may be no remaining common identifiers unique to both parties. The problem only compounds when a user wants to associate several parties with a common identifier. Note that assigning separate common identifiers to each user does not increase the total number of common identifiers required by the system, which need be no greater than the maximum personal phone book of each user. Using separate common identifiers for each user also allows the system to assign local or convenient common identifiers to each user. This can be especially useful if the two users reside in different calling zones or different countries. Many other advantageous features are contemplated as will be enumerated below.

The number of common identifiers required by the system is not nearly as large as might be imagined. In fact, the minimum number of common identifiers required is only as large as the largest phone book of an individual subscriber. For example, if the service were to support personal phone books with up to 1000 entries, then 1000 common identifier phone numbers would suffice to service an unlimited number of subscribers. This is because, even if one subscriber is associated with all 1000 common phone numbers, these same common phone numbers can also be associated with an unlimited number of other users because each subscriber number, common number combination is unique and can thereby be uniquely identified by the system. Thus, a single service-provided number can be used by many subscribers, since the phone number of each participant is a unique identifier that can be recognized by the system and handled accordingly. As explained above, it may be advantageous to assign different common identifiers to each user for which the system establishes an association. For example, the system may assign user "A" one system-assigned ten-digit phone number to reach party "B", while the system may assign user "B" the same or a different ten-digit phone number to reach party "A". In a typical embodiment, at least two phone numbers, the subscriber's and a second party's, are associated with service-provided common numbers.

BRIEF DESCRIPTION OF THE DRAWINGS

Various embodiments of the present invention taught herein are illustrated by way of example, and not by way of limitation, in the figures of the accompanying drawings, in which.

DETAILED DESCRIPTION OF THE INVENTION

Figure 1:
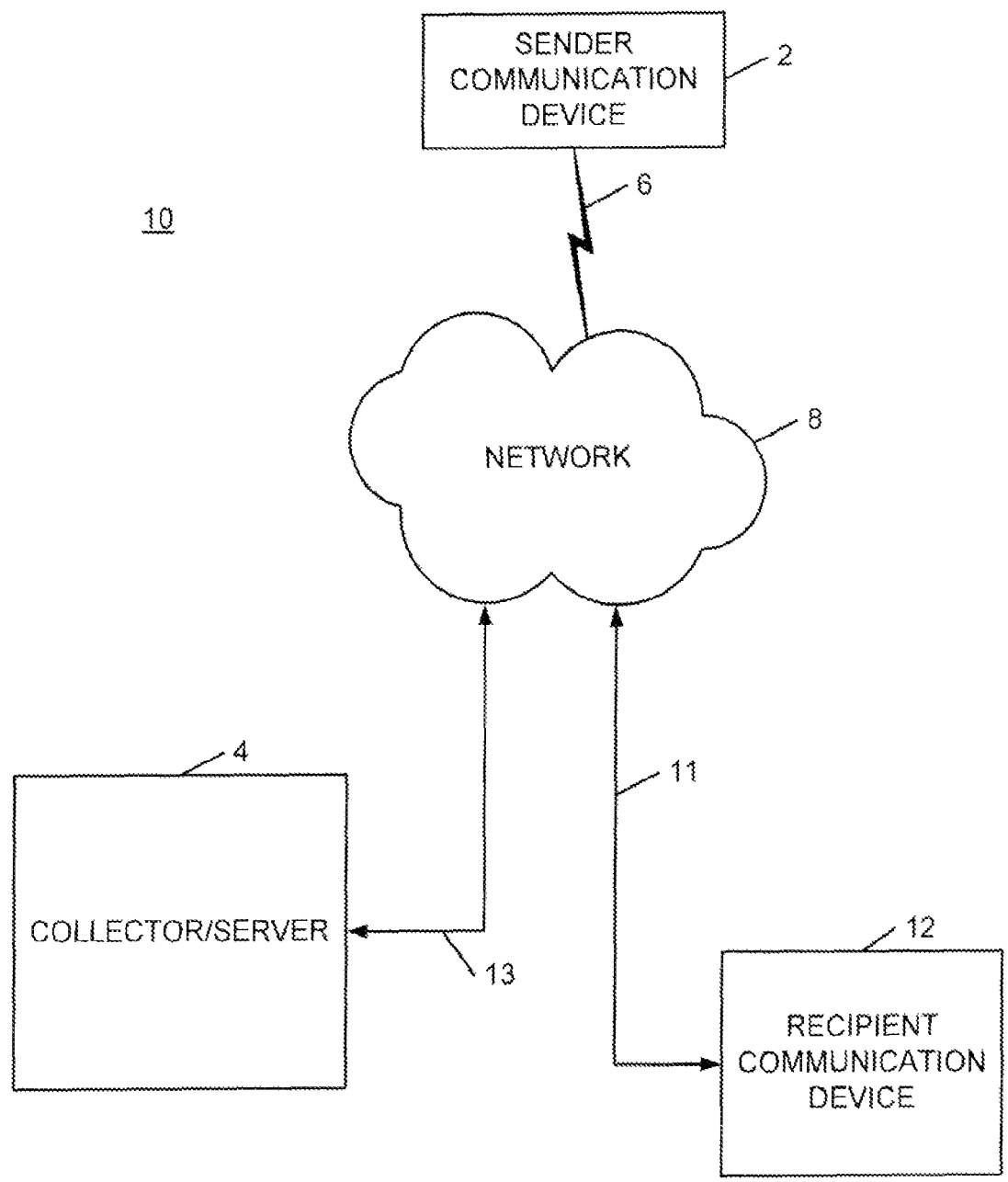
FIG. 1 illustrates a simplified block diagram exemplifying a provided communication system.

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to anyone of the embodiments of the invention described herein, and any equivalents. Furthermore, reference to various feature(s) of the "present invention" throughout this document does not mean that all claimed embodiments or methods must include the referenced feature(s).

Systems, devices, and methods providing enhanced communication service with ubiquitous connectivity between users are provided. Subscriber data comprising their name, phone number, SMS messaging number, Email address, and other useful information may be stored by the system. One element of the system is the use of common identifiers linking subscriber and recipient communication devices, such as mobile phones. Common identifiers are advantageously ten-digit phone numbers, although other identifiers that provide a communications link, such as an Email or SMS address or URL, can be utilized. In some embodiments, common identifiers may be assigned automatically by the system in response to certain circumstances as will be described. In other embodiments, one or more common identifiers may be pre-assigned to a subscriber. In any of these scenarios, the user may be a registered subscriber to the service, thereby providing them with additional options, features, and choices.

FIG. 1 is a simplified and abstract block diagram exemplifying a communication system 10 for originating, storing, managing, and delivering various forms of data. Communication system 10 includes one or more communication devices 2 for communicating data with a collector/server 4 over network 8 for subsequent access by recipient's or recipients' communication device(s) 12. Communication devices 2 are shown connected wirelessly to network 8 by wireless link 6, whereas recipient communication devices 12 are shown with wired connection 11, although any of these devices may have wireless or wired connections to network 8. Wireless link 6 can be a part of a cellular or wireless network operating according to any voice and/or data communication standard. Network 8 can include any variety of non-wireless transmission media including, without limitation, fiber optic cable, twisted-pair wire, or coaxial cable. Network 8 can also include a combination of connected sub-networks; e.g., a cellular network connected to a Public Switched Telephone Network (PSTN).

Communication devices 2 include any type of device capable of transmitting data, which includes voice or other audio content, text or other symbols, images or other graphics, and video content, or any combination thereof. Data includes messages as well as metadata appended to or transmitted separately from messages. A message is a collection of data formatted to anyone of a variety of message formats. Metadata includes identifiers (ID's), headers, addresses, footers, or other additional information related to the message or its transmission. In some embodiments, communication device 2 transmits voice messages in the device's wireless cellular protocol, such as CDMA direct sequence BPSK or QPSK. In some embodiments, communication device 2 may be an Internet-enabled communication device configured to transmit messages and data files formatted in the transmission control protocol (TCP) of the Internet protocol (IP) suite.

Voice and data files are preferably transmitted as digital data, but over some parts of the system can be transmitted as analog data that may be converted to digital data at or before the collector/server 4. For example, analog voice data from a PSTN may be converted to digital data for subsequent transmission in a digital cellular network. Communication device 2 thus can be a cellular or PSTN telephone, a personal digital assistant (PDA) or hybrid thereof, a computer (portable or desktop), a one-way or two-way radio device, such as a pager, or any communication device. Communication devices 2 may be further integrated with other devices, such as a camera, camcorder, microphone, or voice recorder, for example. Communication device 2 is preferably operated locally by a sender of the data, but it should be understood that the communication device may be controlled remotely through a communication device user interface. Although described as a device which sends data, communication devices 2 may also be configured to receive data. Likewise, recipient devices 12 may be configured to send data.

Figure 2:
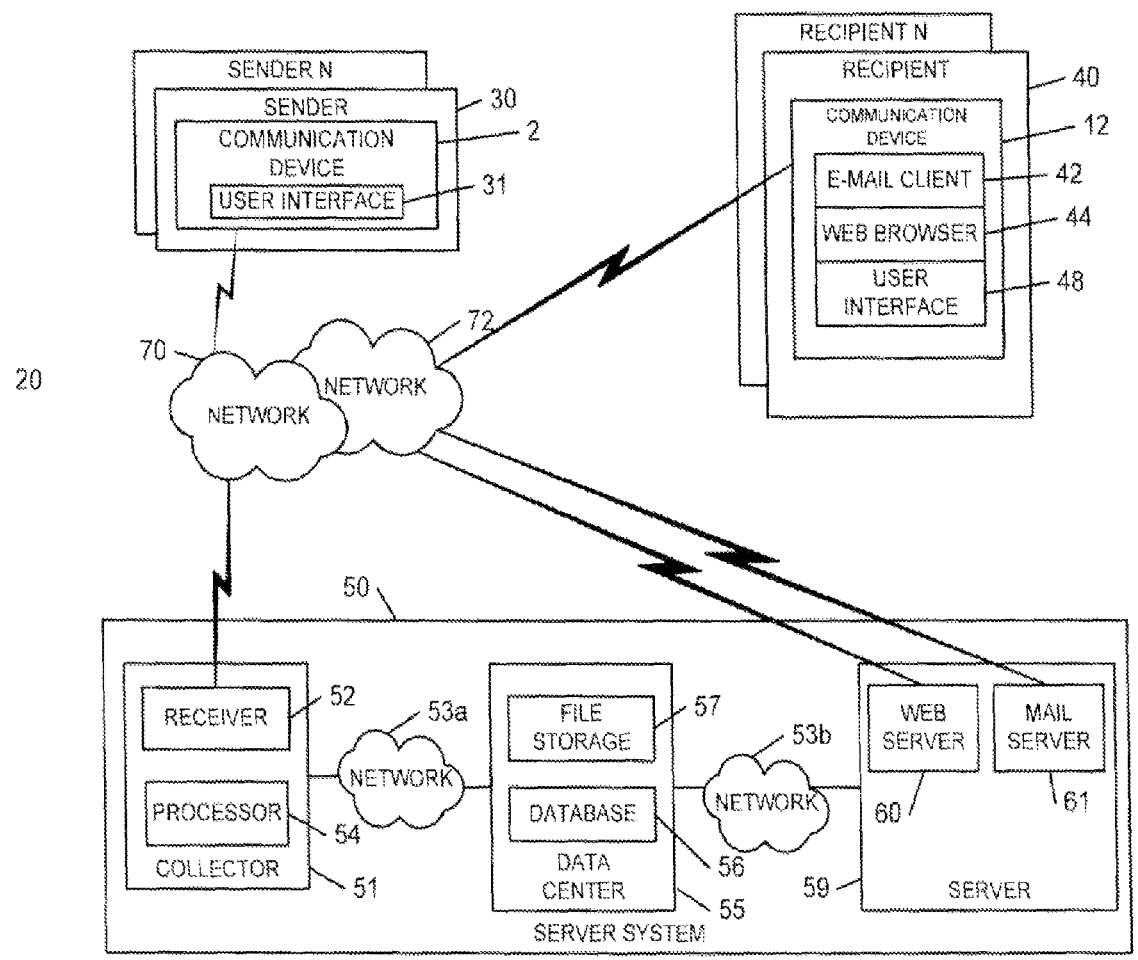
FIG. 2 illustrates a further provided communication system.

Referring now to FIG. 2, a more detailed embodiment of the invention is illustrated. Communication system 20 includes a sender or senders 30, a communication device or devices 2, a server system 50, and a recipient 40. Sender 30 represents any entity that communicates a message—intended for a message recipient—using communication device 2. Sender 30 sends communications using communication device 2 in one of many possible ways using a transmit action. For voice communication, the transmit action may include dialing a ten-digit telephone number associated with the recipient to initiate a live voice communication. The transmit action can also include other transmit actions, such as pressing a button and speaking (i.e. "press-to-talk"), taking a photo or video, or touching a pad with a stylus. The transmit action may also include entering text, selecting choices from menus, etc. The message recipient can be a person's communication device, a group of persons' communication devices, or a storage location on the server system 50.

Communication device 2 may be configured to transmit sender 30's message via a first communications network 70 to a particular, unique address in file storage 57, which is one of a plurality of unique addresses associated with server system 50. Communication network 70 can include at least one wireless link. The message can be transmitted along with metadata, including at least a unique ID of communication device 2. Additional metadata sent with the message can include data representing the length, urgency, time of transmission, information associated with call forwarding of the original message, etc. Unique addresses associated with server system 50 may be directly associated with an address or identity of any intended recipient 40. Alternatively, the unique address may be associated with an intended recipient 40 by reference to metadata in the message and related metadata stored in a database 56 in server system 50.

Communication device 2 can be a standard telephone, cell phone, Nextel phone with iDEN capability, radio or satellite phone, or wireless PDA or programmable phone device running special software, or another communication device. The unique address can be a PSTN ten-digit phone number, an iDEN private ID number, an IP address, a Uniform Resource Locator (URL) address, or any other unique address that can be sent by communication device 2 and recognized by server system 50. In one embodiment, server system 50 includes collector 51, data center 55, and server 59. Collector 51 can include one or more receivers 52, each of which has a unique address that is addressable by communication device 2. Receiver 52 receives a message and associated metadata, preferably in the receiver's native format. Collector 51 also includes processor 54 that can reformat a received message and associated metadata into a format meaningful to the memory structures in data center 55, which include file storage 57 and database 56, and route the message and metadata to data center 55 over data center network 53a. Data center network 53a can include a WAN, LAN, PAN, bus, or any other connection medium or communications platform and protocol.

In an alternative embodiment, collector 51 can be interfaced with an electronic device such as a router, which can be capable of receiving and routing multiple unique addresses. Thus, collector 51 can comprise an interface, such as an IP interface configured to connect collector 51 with such an electronic gateway. In such an embodiment, collector 51 can still comprise a receiver portion configured to receive messages and associated metadata routed from the electronic gateway, although not necessarily in the format native to the particular type of communication device 2 used. Accordingly, collector 51 can utilize processor 54 to reformat the received messages and associated metadata into a format meaningful to the memory structures in data center 55, and route the message metadata to data center 55 over data center network 53a. Database 56 accepts message metadata from collector 51 and parses the received data into its components, including the content of the sender's message, and the unique communication device identifier.

Server system 50 can also include server 59, which has a Web server 60 and a mail server 61. While functionally distinct, Web server 60 and mail server 61 may be a single functionally integrated server. Further, each server may be embodied as a servlet program resident on a host server platform. Server 59 can be connected with data center 55 via server network 53b, which like data center network 53a can also include a WAN, LAN, PAN, or bus or any other type of communications platform. In fact, server system 50's networks 53a and 53b can be combined into a single network connecting collector 51, data center 55, and server 59. It will be understood by those of ordinary skill that server 59 will include a processor, memory, and software sufficient to carry out its functions. Server 59 can further include a farm of servers distributed among separate server devices or spread geographically via connections to server network 53b. Server 59 receives requests from either recipient 40 or sender 30, and responds to requests either through Web server 60 or mail server 61. Mail server 61 transmits electronic notifications, via Email or Short Message Service (SMS) protocol, to a requester or recipient of a message. The notification can include a hypertext link to Web server 60. Web server 60 receives a copy of a requested message from data center 55, and serves up the copy in a Webpage to the requester or recipient. The Webpage can be formatted according to a markup language, such as extensible markup language (XML) or hypertext markup language (HTML), and downloaded through second communications network 72 via any transport technique to a browser or other rendering program.

Sender 30 typically includes a user interface 31 for accessing and retrieving data from server 59 of server system 50 via second communications network 72. Communications networks 70 and 72 may be integrated into a single network, or may be distinct but connected networks. User interface 31 can be a computer, a cellular or landline phone, a PDA, or any other device capable of receiving data. In one embodiment, user interface 31 includes a computer and a display, and the requested information is displayed as an HTML or XML page in a Web browser program rendered on a display. Although represented in FIG. 2 as part of one sender block 30, it should be understood that communication device 2 and user interface 31 may be combined in the same device, different devices, or even remotely positioned and/or operated by different persons. Communication device 12 is associated with recipient 40, which can be any person or entity for which a sender's message is ultimately intended. FIG. 2 shows more than one recipient 40, and it should be understood that there can be any number of recipients 40. Recipient 40's communication device 12 receives transmissions from communication device 2 via network 70 or 72, which may include wireless voice or data transmissions. Recipient 40's communication device 12 may be a smart cell phone or PDA with features including an Email client 42 for receiving notifications from mail server 61, and may also include a Web browser 44, or other similar software application program, for receiving and rendering the messages from Web server 60. Messages may also be received by recipient 40 from mail server 61. Sender 30's and recipient 40's communication devices 2 and 12, respectively, may have the same or different features, so long as they each have at least one mode of communication that can be linked through network 70 and/or 72.

Figure 3:
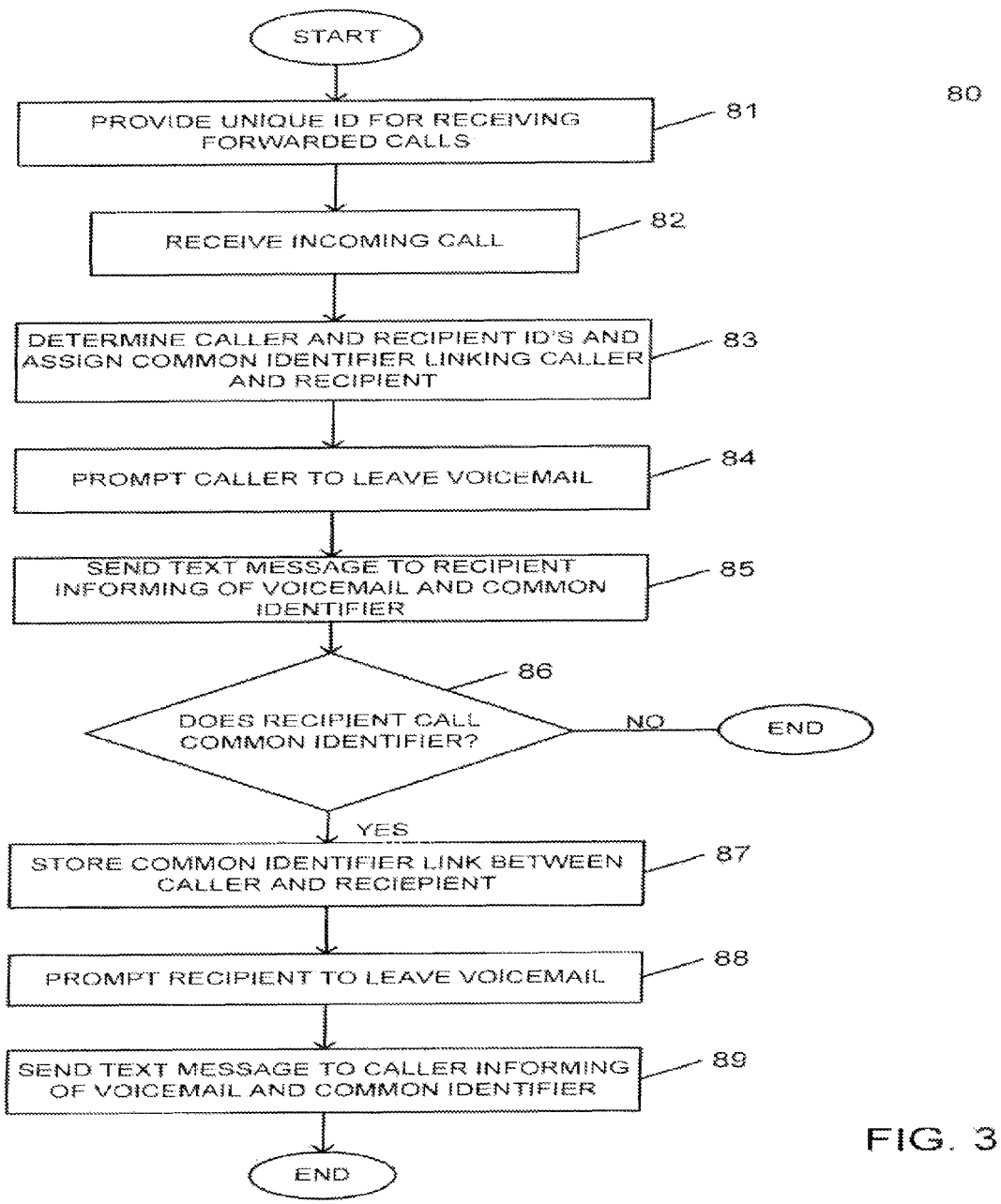
FIG. 3 illustrates the flow of a provided method.

FIG. 3 is a flow chart illustrating a method according to one embodiment of the present invention wherein a communication device not previously associated with a subscriber/recipient phone can be automatically assigned a common identifier. To utilize the features of this embodiment for the exemplary case of the communication devices being mobile phones, a subscriber/recipient can set their mobile phone to forward calls directed to their phone to a phone number linked to a server system. The server system may be programmed to detect to which subscriber the call was originally directed, thereby allowing a single redirect phone number to service multiple subscribers. Alternatively, separate unique redirect phone numbers may be assigned to each subscriber thereby allowing the system to indirectly determine to which subscriber the call is directed. This redirect phone number functions in some aspects as an answering service, with additional and novel features as will be described. Method 80 begins at block 81 where a unique identifier, in this example, a phone number is provided by the server system specifically for receiving calls forwarded from a subscriber communication device. At block 82, the system receives an incoming call that has been redirected from a subscriber's phone to the special redirect phone number provided by the system. Then, at block 83, the system determines the caller ID (phone number) of the originating caller and the phone number of the recipient to which the call was originally directed and provides a common identifier phone number that associates the caller and subscriber/recipient phone numbers with a common identifier phone number. For the reasons previously discussed, the system may provide the same or different common identifiers to caller and subscriber/recipient.

Most phone systems, especially in North America, embed the caller ID (phone number) of the originating device in the access message as metadata. Accordingly, the server systems are configured to decode this unique caller ID. The metadata of forwarded calls may also include the ID of the phone number to which the call was originally directed. If the forwarded call includes the ID of the intended receiver phone or device, then the server can be configured to also decode the recipient's phone ID. Alternatively, if the phone system does not attach the unique recipient ID with redirected calls, the server can assign different redirect phone numbers to each recipient/subscriber, thereby allowing the server to determine indirectly the forwarding device's unique ID. To maintain uniqueness, common identifier numbers will preferably be ones not already associated with the unique device identifiers of the caller and recipient/subscriber. To ensure this uniqueness, the system server maintains a database of the unique device identifiers of all users, both subscriber and non-subscriber, and queries the database to determine a particular common identifier not already assigned to those devices. If the same common identifier is to be assigned to two or more users, the server must further select a common identifier that has not already been assigned to any of the users included in the association. Alternatively, the server may assign any convenient common identifier to each user.

At block 84, the caller can be instructed to leave a voice message, which of course they may either accept or decline. The outgoing message can include a typical answering machine type message that has been prerecorded by the subscriber informing the caller that the subscriber can't answer the phone, but that if they leave a voicemail, the system will contact the subscriber by other means. The system can also be configured to proceed to the next block even if a voice message is not left by the caller.

At block 85 the system can be configured to send a message such as an SMS text message to the subscriber recipient informing them that a call directed to them has been forwarded to the system and that a common identifier has been assigned, at least temporarily, which they can call to reply. Additionally, the system message may include other information such as whether a voicemail has been left by the caller that can be accessed by calling the system-assigned common number, or to provide a reply voice message, and/or send a text message to the caller. At block 86 the system monitors the common identifier number to see if the recipient responds. This block may optionally include terminating the process and deleting the association with the common number it created at block 82 if, after some reasonable period of time, the number has not been called. If, as expected, the subscriber calls the common number, the system then proceeds to block 87 where the system stores the common identifier number and its associations with the caller and recipient in a substantially permanent database. At block 88 the system may prompt the subscriber to leave a voicemail for the caller. Other options are also possible at block 88 such as configuring the common number to receive text messages, or converting the voice message to text. The recorded message prompting the recipient may facilitate various options such as: "Press one to leave a reply voicemail. Press two to be connected directly with the caller. Press three to leave a voice message to be converted and sent as a text message." These examples are only by way of illustration and various other options are possible. Finally, at block 79 the system may send a text message to the caller informing them that a reply voicemail has been left by the subscriber and informing them of the common phone number to call to retrieve the voicemail and to be used to facilitate further communications with the subscriber.

Automatically associating a caller and recipient with a common number that is permanently maintained by the system enables additional useful features beyond facilitating the single attempted call described above. By using the common number instead of the intended recipient's actual phone number, any of various features and services provided by the service can be enabled. For example, the common number may be a local number, thereby avoiding toll charges, even including international calls. As has already been mentioned, it may be advantageous to set up two common identifier numbers linking the two parties; for example, the system can set up one common phone number that is local to the first party and another phone number that is local to the second party. Another feature that may be provided by the system is the option of preemptively leaving a voice message when the caller would prefer not to speak directly to the recipient at that time. Yet another option would be to allow the subscriber to associate multiple recipient phone numbers with a single common number. This feature could be implemented so as to allow the subscriber to leave a single voicemail for multiple parties. The recipients could be informed of the voicemail by various means including sending text messages, by having the service place automated calls to each recipient, or by other means or combinations thereof.

Thus use of common identifiers provides a way for a server system to provide essentially unlimited options for sending and receiving messages. For example, the system can provide means, such as a Webpage, for specifying the modes for sending and receiving messages. The modes can be further tailored individually for each common identifier. For example, a subscriber may prefer to receive only SMS messages from a particular caller associated with a particular common identifier. Accordingly, the subscriber can indicate this preference using a Webpage provided for this purpose by the system. In this example, the server system would convert any voice calls to the subscriber to text and forward the converted message using the SMS protocol Recognizing that the other party associated with the common identifier does not prefer SMS text messages, the subscriber can choose to have all messages, text or voice, delivered to that party as voice messages. Other possibilities and combinations abound, given the essentially unlimited capacity for a processor system to receive message data in one format and convert and transmit that message data in another format as preferred by each user or required by a user's particular communication device.

Other enhancements to the exemplary embodiment can also be implemented according to the teachings of contained herein. For example, adding additional recipients to the same common identifier provides the further advantage of allowing the caller to send a single voicemail and/or text notifications to a group of recipients rather than having to contact each recipient individually. Other enhancements that are enabled by the use of a common identifier include providing a user the option of disclosing their phone number to the recipient, or keeping this and other personal information confidential: i.e., anonymous messaging. These and other preferences could be selected by the user by anyone of several commonly used means such as logging onto a Website provided by the service, by responding to voice queries with the appropriate keypad/number response, or by talking directly with a service representative.

While the invention as described is most useful in terms of mobile phone communications, it may also include landline phones as well. For example, certain telephone service providers such as Sprint offer text messaging support for landline phones whereby text messages are converted to voice and vice versa. Alternatively, the service provided by the present invention could recognize that a recipient's phone number was a landline and thus convert the text message to voice. It should be noted that the invention as contemplated requires no corresponding specialized software to be installed on any of the communication devices that use the system, or any changes or additions to the subscribers telephone service provider, but simply utilizes the basic voice, data, and SMS messaging capabilities found on almost all contemporary mobile phones and other communication devices such as smart phones, PDA's, and even some landline phones. Additional advanced phone features such as Internet access, visual voicemail, and other new or yet to be contemplated capabilities, while enhancing the convenience and utility of the service, are not required by the embodiments disclose herein.

Figure 4:
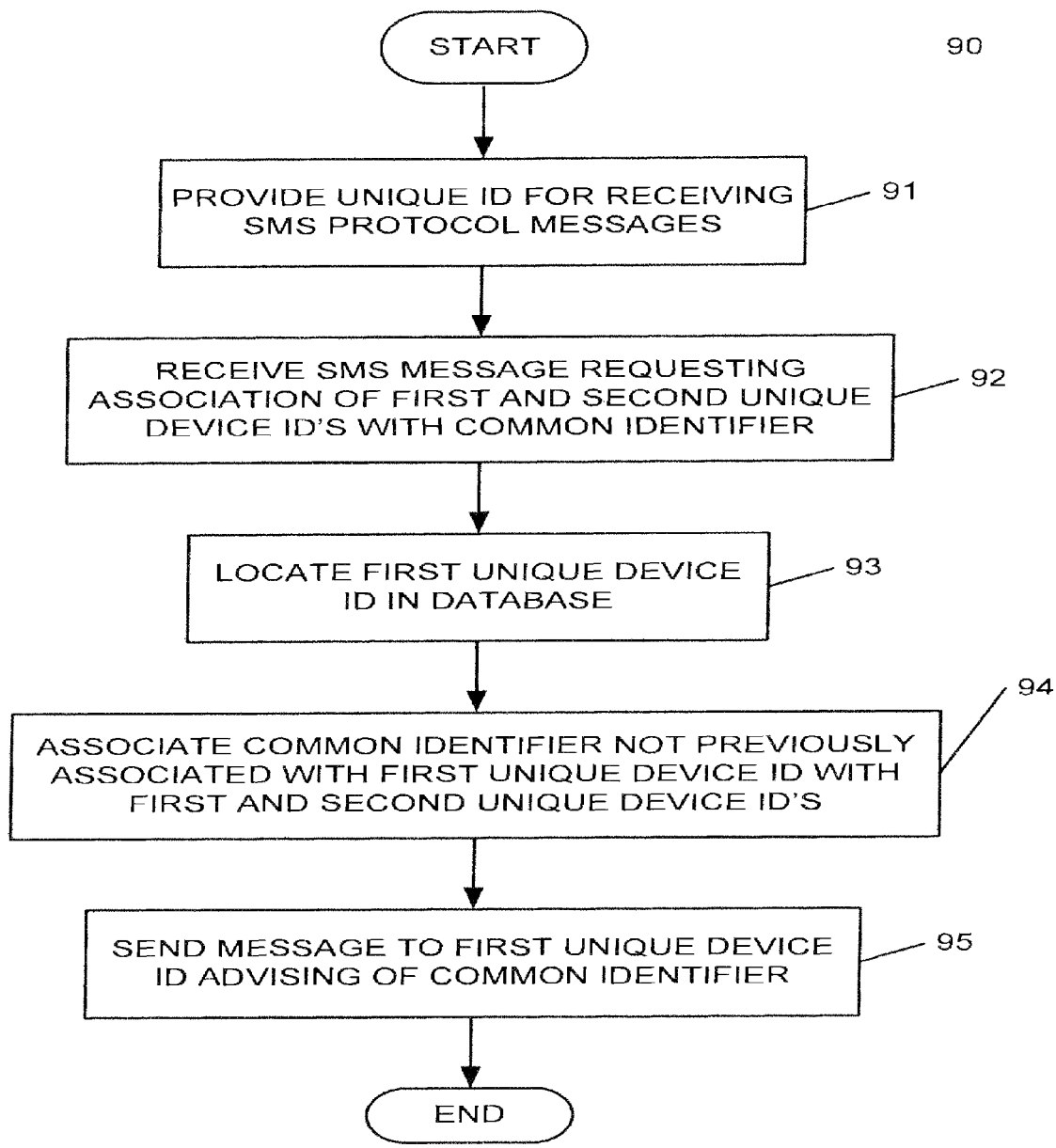
FIG. 4 illustrates the flow of an additional provided method.

FIG. 4 is a flow chart illustrating another method according to the present invention wherein a system subscriber can use an SMS protocol text message to cause the system to provide a common identifier linking the subscriber and any other party's communication device. The method 90 begins at block 91, where the server system provides a unique ID, which can be a ten-digit phone number, that has been configured for receiving SMS protocol messages. At block 92, the system receives an SMS message enumerating a first unique device ID of a subscriber, a second unique device ID, and requesting a common identifier associating or linking the first and second unique device ID's. The system may require that the SMS message follow a prescribed format to facilitate the system correctly interpreting the text, thereby allowing the system to automatically carry out the request. Otherwise, the SMS message may need to be read and interpreted by a person associated with the system.

At block 93, the system searches its database to find the subscriber's unique device ID, including all common identifiers associated with that subscriber's device ID. Then, at block 94 the system selects a common identifier not already associated with that subscriber's unique device ID. Finally, at block 95 the system sends a message to the subscriber's communication device advising the subscriber that the request has been carried out and enumerating the system-assigned common identifier. The advisory message can also be sent as an SMS message, although the subscriber may direct the system to send the message in any other suitable format.

While certain embodiments of the inventions have been described above, it will be understood that the embodiments described are by way of example only. Accordingly, the inventions should not be limited based on the described embodiments. Rather, the scope of the inventions described herein should only be limited by the claims that follow when understood in conjunction with the above description and accompanying drawings.

What is claimed is:

1. A method for processing communications in a server system, the server system comprising at least one processor, the method comprising:
   providing a unique receiver identifier associated with the server system configured for receiving SMS protocol messages;
   receiving by the server system a SMS protocol text message comprising a request to associate a first enumerated unique device identifier and a second enumerated unique device identifier with a common identifier;
   locating by the server system the first unique device identifier within a database of unique identifiers maintained by the server system;
   associating by the server system a common identifier not previously associated with the first unique device identifier with the first and second unique device identifiers, wherein a first communication device associated with the first unique device identifier is configured to communicate with the server system using the common identifier for a communication with a second communication device associated with the second unique identifier, and wherein the second communication device associated with the second device identifier is configured to communicate with the server system using the common identifier for a communication with the device associated with the first unique device identifier; and
   sending by the server system a message to the first communication device advising of the common identifier associating the first and second unique device identifiers.

2. The method of claim 1, further comprising sending a text message to the second communication device advising of the receipt of a communication for the second communication device by the server system from the first communication device.

3. The method of claim 2, wherein the advising includes the common identifier associated with the first and second unique device identifiers.

4. The method claim 2, wherein the advising includes advising by the server system of a voice message from the first communication device and the common identifier associated with the first and second unique device identifiers.

5. The method of claim 4, further comprising receiving a call from the second communication device directed to the common identifier and play back the voice message.

6. The method of claim 2 further comprising receiving a call from the second communication device directed to the common identifier and redirect the call to the first communication device.

7. The method of claim 4, further configured to receive a call from the second communication device directed to the common identifier and record a voice message therefrom.

8. A computing apparatus for processing communications comprising:
- a memory;
- at least one processor; and
- a storage medium, the storage medium comprising a set of processor executable instructions that, when executed by the processor, configure the computing apparatus to provide a unique receiver identifier associated with server system configured for receiving SMS protocol messages;
- receive a SMS protocol text message comprising a request to associate a first enumerated unique device identifier and a second enumerated unique device identifier with a common identifier;
- locate the first unique device identifier within a database of unique identifiers maintained by the server system;
- associate a common identifier not previously associated with the first unique device identifier with the first and second unique device identifiers, wherein a first communication device associated with the first unique device identifier is configured to communicate with the server system using the common identifier for a communication with a second communication device associated with the second unique identifier, and wherein the second communication device associated with the second device identifier is configured to communicate with the server system using the common identifier for a communication with the device associated with the first unique device identifier; and
- send a message to the first communication device advising of the common identifier associating the first and second unique device identifiers.

9. A method for processing communications by a server system, the server system comprising at least one processor, the method comprising:
- associating by the server system a first common identifier with a first sender device identifier and a first group of receiver device identifiers, such that a first sender device associated with the first sender device identifier is configured to communicate, via the first common identifier, with at least one first receiver device associated with at least one first receiver device identifier in the first group of receiver device identifiers; and
- associating by the server system the first common identifier with a second sender device identifier and a second group of receiver device identifiers, such that a second sender device associated with the second sender device identifier is linked via the first common identifier with at least one second receiver device associated with at least one second receiver device identifier in the second group of receiver device identifiers,
- wherein (i) the first sender device is configured to communicate with the server system using the common identifier for a communication with the at least one first receiver device, (ii) the at least one receiver device is configured to communicate with the server system for a communication with the first sender device, (iii) the second sender device is configured to communicate with the server system using the common identifier for a communication with the at least one second receiver device, and (iv) the at least one receiver device is configured to communicate with the server system for a communication with the first sender device.

10. The method of claim 9, wherein the first group of receiver device identifiers comprises a single first receiver device identifier and only a signal first receiver device is associated with the first receiver device identifier.

11. The method of claim 9, wherein the second group of receiver device identifiers comprises a single second receiver device identifier and only a signal second receiver device is associated with the second receiver device identifier.

12. The method of claim 9, further comprising associating by the server system a second common identifier with the first sender device identifier and the at least one first receiver device identifier in the first group of receiver device identifiers, the at least one first receiver device identifier being associated with the at least one first receiver device, such that the first sender device is further configured to communicate, via the second common identifier, with the at least one first receiver device, wherein (v) the first sender device is configured to communicate with the server system using the second common identifier for a communication with the at least one first receiver device, and (vi) the at least one first receiver device is configured to communicate with the first sender device using the second common identifier for a communication with the first sender device.

13. The method of claim 12, wherein the first common identifier is a local number with respect to the first sender device identifier and the second common identifier is a local number with respect to the at least one first receiver device identifier.

14. The method of claim 9, further comprising:
- receiving at the server system, corresponding to the first common identifier, a message from the first sender device;
- determining by the server system, the at least one first receiver device identifier, based on the first sender device identifier and the first common identifier;
- forwarding by the server system, the message to the at least one receiver device.

15. The method of claim 14, wherein the forwarded message lacks the first sender device identifier and any personal information associated therewith.

16. A computing apparatus for processing communications comprising:
- a memory;
- at least one processor; and
- a storage medium, the storage medium comprising a set of processor executable instructions that, when executed by the processor, configure the computing apparatus to:
- associate by the server system a first common identifier with a first sender device identifier and a first group of receiver device identifiers, such that a first sender device associated with the first sender device identifier is configured to communicate, via the first common identifier, with at least one first receiver device associated with at least one first receiver device identifier in the first group of receiver device identifiers,
- associate by the server system the first common identifier with a second sender device identifier and a second group of receiver device identifiers, such that a second sender device associated with the second sender device identifier is configured to communicate, via the first common identifier, with at least one second receiver device associated with at least one second receiver device identifier in the second group of receiver device identifiers,
- wherein (i) the first sender device is configured to communicate with the server system using the common identifier for a communication with the at least one first receiver device, (ii) the at least one receiver device is configured to communicate with the server system for a communication with the first sender device, (iii) the second sender device is configured to communicate with the server system using the common identifier for a communication with the at least one second receiver device, and (iv) the at least one receiver device is configured to communicate with the server system for a communication with the first sender device.

* * * * *